US011113582B2

(12) United States Patent
Wang et al.

(10) Patent No.: US 11,113,582 B2
(45) Date of Patent: Sep. 7, 2021

(54) METHOD AND SYSTEM FOR FACILITATING DETECTION AND IDENTIFICATION OF VEHICLE PARTS

(71) Applicant: Alibaba Group Holding Limited, Grand Cayman (KY)

(72) Inventors: Jian Wang, Beijing (CN); Danni Cheng, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/555,955

(22) Filed: Aug. 29, 2019

(65) Prior Publication Data

US 2020/0074215 A1    Mar. 5, 2020

(30) Foreign Application Priority Data

Aug. 31, 2018    (CN) .......................... 201811015495.X

(51) Int. Cl.
*G06T 7/70*    (2017.01)
*G06K 9/62*    (2006.01)
(Continued)

(52) U.S. Cl.
CPC .............. *G06K 9/628* (2013.01); *G06N 3/08* (2013.01); *G06Q 10/10* (2013.01); *G06T 7/70* (2017.01);
(Continued)

(58) Field of Classification Search
CPC ........... G06K 9/00671; G06K 2209/23; G06K 9/6256
See application file for complete search history.

(56) References Cited

U.S. PATENT DOCUMENTS 8,180,629 B2    5/2012    Rehberg
9,607,138 B1    3/2017    Baldwin
(Continued)

FOREIGN PATENT DOCUMENTS

WO    2017059576    4/2017
WO    2018055340    3/2018

OTHER PUBLICATIONS

Hyungtae Lee et al.: "Fast Object Localization Using a CNN Feature Map Based Multi-Scale Search", arxiv.org, Cornell University Library, 201 Olin Library Cornell University Ithaca, NY 14853, Apr. 12, 2016, XP080695042, Section 3.2, Figure 3.
(Continued)

*Primary Examiner* — Sam Bhattacharya
(74) *Attorney, Agent, or Firm* — Shun Yao; Park, Vaughan, Fleming & Dowler LLP

(57) ABSTRACT

One embodiment facilitates detection and identification of vehicle parts. During operation, the system stores a captured image of a vehicle, wherein the captured image includes a plurality of parts of the vehicle. The system detects a first area of the captured image in which a first part of the vehicle is located. The system identifies, from a plurality of predetermined classes, a class corresponding to the first part in the detected first area, wherein the class indicates a location of the first part in relation to the vehicle. The system generates a result which indicates a list including an insurance claim item and corresponding damages based on the first area, the first part, and the class corresponding to the first part.

20 Claims, 9 Drawing Sheets
(2 of 9 Drawing Sheet(s) Filed in Color)

(51) Int. Cl.
    *G06Q 10/10*      (2012.01)
    *G07C 5/00*      (2006.01)
    *G06N 3/08*      (2006.01)

(52) U.S. Cl.
    CPC .... *G07C 5/008* (2013.01); *G06T 2207/30252* (2013.01)

(56) References Cited

U.S. PATENT DOCUMENTS

| | | |
|---|---|---|
| 2001/0046659 A1 | 11/2001 | Oster |
| 2009/0206993 A1 | 8/2009 | Di Mambro |
| 2013/0015946 A1 | 1/2013 | Lau |
| 2013/0208103 A1 | 8/2013 | Sands |
| 2014/0037184 A1 | 2/2014 | Gorski |
| 2014/0270411 A1 | 9/2014 | Shu |
| 2015/0103170 A1* | 4/2015 | Nelson .............. G06Q 10/20 348/148 |
| 2015/0110364 A1 | 4/2015 | Niinuma |
| 2015/0110366 A1 | 4/2015 | Sezille |
| 2015/0341370 A1 | 11/2015 | Khan |
| 2016/0034786 A1 | 2/2016 | Suri |
| 2016/0063235 A1 | 3/2016 | Tussy |
| 2016/0283787 A1 | 9/2016 | Nepomniachtchi |
| 2016/0307029 A1 | 10/2016 | Vaknin |
| 2017/0048244 A1 | 2/2017 | Loughlin-McHugh |
| 2017/0060867 A1 | 3/2017 | Moutinho |
| 2017/0061563 A1 | 3/2017 | Falkenstern |
| 2018/0083973 A1 | 3/2018 | Paraskevas |
| 2020/0349370 A1* | 11/2020 | Lambert .............. G06T 7/75 |

OTHER PUBLICATIONS

Zhou Huabing et al.: "Image Classification Based on Region of Interest Detection", Visual Communications and Image Processing; Jan. 20, 2004; San Jose; vol. 9813, Dec. 14, 2015, pp. 9813OU-9813OU, XP060063208, paragraph [0001]; figure 1.

\* cited by examiner

METHOD AND SYSTEM FOR FACILITATING DETECTION AND IDENTIFICATION OF VEHICLE PARTS

RELATED APPLICATION

Under 35 U.S.C. 119, this application claims the benefit and right of priority of Chinese Patent Application No. 201811015495.X, filed on 31 Aug. 2018.

BACKGROUND

Field

This disclosure is generally related to the technical field of artificial intelligence and machine learning. More specifically, this disclosure is related to a method and system for facilitating detection and identification of vehicle parts.

Related Art

In conventional vehicle damage assessment approaches, a vehicle insurance company can send a professional (such as an insurance adjuster) to conduct a manual on-site survey and determine a repair plan for a damaged vehicle. After the professional captures images of the damaged vehicle, these "captured images" can be compared against similar images in a library or database of images. The library can include images of damaged vehicle parts, which were previously captured from other images of other damaged vehicles ("library images"). In a conventional vehicle damage assessment approach, a system can determine the damage assessment result of the damaged vehicle based on the comparison of the captured images with the library images.

However, conducting a manual survey and determining a repair plan based on the comparison of the captured images against library images can result in a long processing time, and can incur a significant cost in manpower and training of professionals. Current approaches can use image-based artificial intelligence and machine learning in vehicle damages assessment approaches that may reduce both processing time and labor costs. For example, these approaches can enable automatic identification of damaged parts and the degree of the damage based on on-site pictures of the vehicle taken by users. In addition, the on-site pictures of the vehicle can be used by computer-vision image identification technology with artificial intelligence to provide a repair solution. Therefore, by automating the survey and damage assessment approaches, the labor costs incurred by a vehicle insurance company can be reduced and the vehicle insurance claiming experience of a user can be improved.

While using the automated survey and damage assessment approach can result in some benefits, some challenges still remain in providing accurate identification of vehicle parts and the degree of damage of those parts.

SUMMARY

One embodiment facilitates detection and identification of vehicle parts. During operation, the system stores a captured image of a vehicle, wherein the captured image includes a plurality of parts of the vehicle. The system detects a first area of the captured image in which a first part of the vehicle is located. The system identifies, from a plurality of predetermined classes, a class corresponding to the first part in the detected first area, wherein the class indicates a location of the first part in relation to the vehicle. The system generates a result which indicates a list including an insurance claim item and corresponding damages based on the first area, the first part, and the class corresponding to the first part.

In some embodiments, the system detects the first area by performing the following operations. The system divides the captured image into a grid of squares. The system maps, for a respective square, the respective square to a first number of target areas, wherein a respective target area comprises a bounding box associated with at least the respective square. The system determines, for the respective target area, a confidence coefficient which indicates a likelihood that the respective target area corresponds to a first predetermined class. The system determines, for the respective square, a probability which indicates a likelihood that the respective square corresponds to each of the predetermined classes. The system selects, based on the confidence coefficient and the probability, a second area as the first area in which the first part of the vehicle is located, wherein the second area is selected from all target areas mapped to each of the squares.

In some embodiments, a second number of squares of the grid in a horizontal direction are the same as a second number of squares of the grid in a vertical direction, and the first number and the second number are positive integers.

In some embodiments, prior to storing the captured image of the vehicle, the system acquires a plurality of unsorted images of the vehicle, wherein the unsorted images are captured directly by a user of the vehicle. The system sorts the unsorted images by removing images which are irrelevant or abnormal to obtain a set of captured images which include the captured image.

In some embodiments, detecting the first area is based on a first algorithm. Prior to detecting the first area of the captured image, the system trains the first algorithm based on: images with pre-marked areas indicating final locations for multiple parts of the vehicle; and a plurality of sample images of a predetermined class corresponding to a respective part of the vehicle.

In some embodiments, detecting the first area is further based on the trained first algorithm.

In some embodiments, the first algorithm is a You Only Look Once v2 (yolov2) algorithm, and the first algorithm further comprises a model based on a neural network.

In some embodiments, a class includes one or more of: a left front door; a right front door; a left rear door; a right rear door; a front bumper; a rear bumper; a left front wheel fender; a right front wheel fender; a left rear wheel fender; a right rear wheel fender; a left front tire; a right front tire; a left rear tire; a right rear tire; a lower grille; a middle grille; a left headlight; a right headlight; a left brake light; a right brake light; a left front emergency light; a right front emergency light; a left rear emergency light; a right rear emergency light; a number plate; a front engine hood; and a trunk.

BRIEF DESCRIPTION OF THE FIGURES

The patent or application file contains at least one drawing executed in color. Copies of this patent or patent application publication with color drawing(s) will be provided by the Office upon request and payment of the necessary fee.

In the figures, like reference numerals refer to the same figure elements.

DETAILED DESCRIPTION

Figure 1:
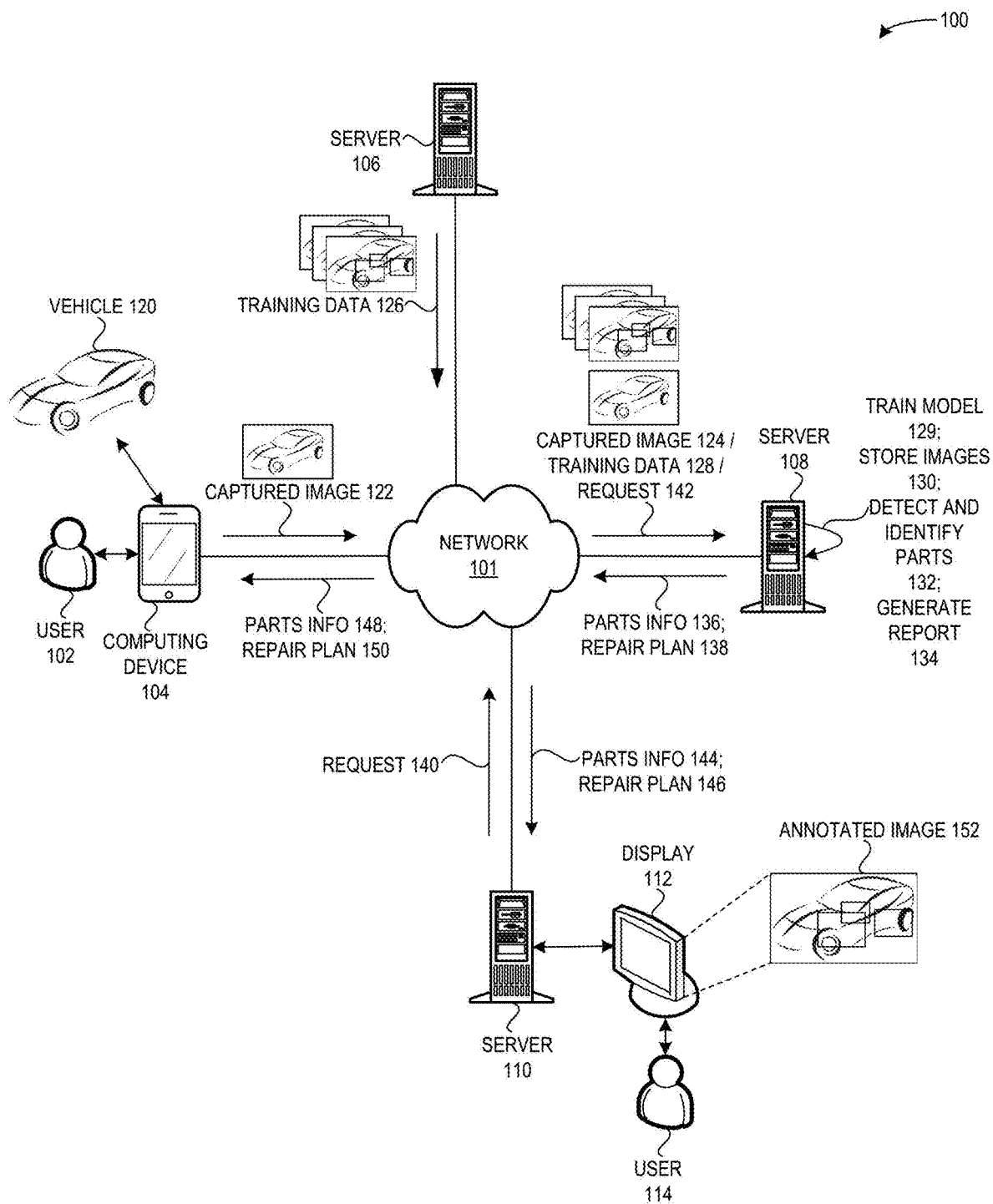
FIG. 1 illustrates an exemplary environment for facilitating detection and identification of vehicle parts, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein address the challenges of accurately detecting and identifying vehicle parts by: detecting, in a captured image of a vehicle, an area in which a vehicle part is located; identifying a class corresponding to the vehicle part; and displaying an annotated image which indicates the detected area, the vehicle part, and the corresponding class. The class can indicate a location of the first part in relation to the vehicle.

As described above, sending a professional to capture on-site images of a damaged vehicle and to determine a repair plan may involve subsequently comparing the captured images with "library images." The damage assessment result can be based on the comparison of the captured images with the library images. However, conducting a manual survey and determining a repair plan based on the comparison of the captured images against library images can result in a long processing time, and can incur a significant cost in manpower and training of professionals. Current approaches can use image-based artificial intelligence and machine learning in vehicle damages assessment approaches that may reduce both processing time and labor costs. For example, these approaches can enable automatic identification of damaged parts and the degree of the damage based on on-site pictures of the vehicle taken by users. In addition, the on-site pictures of the vehicle can be used by computer-vision image identification technology with artificial intelligence to provide a repair solution. Therefore, by automating the survey and damage assessment approaches, the labor costs incurred by a vehicle insurance company can be reduced and the vehicle insurance claiming experience of a user can be improved.

Another challenge in automated survey and damage assessment approaches is that the system must identify not only the damaged parts, but the location of the damaged parts in relation to the vehicle. That is, given a "door" part of a vehicle, the cost of repairing a "left front door" may be different from the cost of repairing a "right rear door." Thus, while using the automated survey and damage assessment approach can result in some benefits, some challenges still remain in providing accurate identification of vehicle parts and the degree of damage of those parts.

The embodiments described herein address these challenges by providing a system which can be trained using pre-marked images (which can include bounding boxes around a specific vehicle part and a corresponding class for the specific vehicle part) and sample images of vehicle parts corresponding to certain classes. Given a user-captured image of a vehicle (e.g., as taken at an accident site by a user in physical proximity to the vehicle), the system can detect an area of the captured image in which a first vehicle part is located. The system can be based on a trained yolov2 algorithm, and can identify a class corresponding to the vehicle part in the detected area, where the class indicates a location of the vehicle part in relation to the vehicle (e.g., "right front wheel" rather than simply "wheel"). Upon identifying the corresponding class for a given vehicle part in a detected area of the captured image, the system can display an annotated image which indicates the detected area, the vehicle part, and the corresponding class, for a plurality of parts of the vehicle.

Furthermore, based on the annotated image and other annotated images of other vehicle parts, the system can generate a report which indicates a degree of damage to a specific vehicle part, and, generally, a degree of damage to the vehicle. This can result in an improved damage assessment approach which reduces the labor costs incurred by a vehicle insurance company and also increases the efficiency of the user's experience in reporting the damages, e.g., in a claims report or subsequent to an accident. Moreover, the embodiments described herein can provide an improved and more accurate method of damage assessment by clearly labeling (annotating) the captured image with bounding boxes which display the detected area, the vehicle part, and the corresponding class. This can result in a more efficient and accurate understanding of the degree of damages, which can result in an improved vehicle loss assessment report.

Exemplary Environment for Facilitating Detection and Identification of Vehicle Parts FIG. 1 illustrates an exemplary environment 100 for facilitating detection and identification of vehicle parts, in accordance with an embodiment of the present application. Environment 100 can include: a vehicle 120; a user 102 associated with a computing device 104; a server 106; a server 108; and a server 110 associated with a display 112 and a user 114. Computing device 104 and servers 106-108 can communicate with each other over a network 101.

Computing device 104 can include a camera which can capture images of, e.g., a vehicle 120 which is a damaged vehicle on-site after an accident. During operation, computing device 104 can send a captured image 122 (of vehicle 120) to server 108 as a captured image 124. Server 108 can obtain and store a plurality of images (function 130). The obtained and stored images can include captured image 124 and training data 128, as described below. Server 108 can detect and identify a plurality of vehicle parts of vehicle 120 based on the captured image 124 and training data 128 (function 132). Server 108 can also generate a report (function 134). The generated report can indicate a degree of damage to the detected and identified vehicle parts, and can also provide a repair plan for the damaged vehicle parts. The generated report can include, e.g., information about the detected and identified parts and a repair plan for fixing those parts (i.e., parts information 136 and a repair plan 138).

Server 108 can send parts information 136 and repair plan 138 back to computing device 104 (as parts information 148 and a repair plan 150), which can be used to display various items and images on a display screen of computing device 104, e.g., based on specific application scenarios. For example, computing device 104 can display, on its respective display screen, an annotated image 152 (shown in FIG. 1 as displayed on display 112) based on parts information 148 and repair plan 150.

In addition, server 110 can send a request 140 to server 108. Request 140 can be, e.g.: a request for all repair plans generated within a predetermined period of time; a request for a repair plan specific to a particular user or time; a request for information about parts relating to a particular vehicle or user or captured image. Server 108 can receive request 140 as a request 142, and, subsequent to performing functions 130, 132, and 134 (as described above), server 108 can send parts information 136 and repair plan 138 back to server 110 (as parts information 144 and a repair plan 146). Upon receiving parts info 144 and repair plan 146, server 110 can display, on its display 112, an annotated image 152 of previously captured image 122. Annotated image 152 can indicate: a first area of captured image 122 in which a first part of the vehicle is located; the first part of the vehicle; and the class corresponding to the first part of the vehicle, where the class can indicate the specific or final location of the first part in relation to the vehicle. Exemplary annotated images are described below in relation to FIGS. 5A and 5B. Computing device 104 can also display, on its respective display screen, annotated image 152 based on parts information 148 and repair plan 150.

Server 110 may also receive parts info 144 and repair plan 146 automatically, e.g., at a predetermined time or time interval and/or without first sending request 140. User 114 can view this information on display 112, and can use the information to conduct further actions, e.g., based on the received information being integrated into a damage assessment application or program (not shown) running on server 108 or 110.

Furthermore, prior to computing device 104 sending captured image 122 to server 108, server 106 can send training data 126 to server 108. Training data 126 can include images with pre-marked or pre-labeled areas indicating final locations for multiple parts of a vehicle. Training data 126 can also include a plurality of sample images of a predetermined class corresponding to a respective part of a vehicle. Server 108 can receive training data 126 (as training data 128), and use training data 128 to train a neural model based on an algorithm, such as the You Only Look Once v2 ("yolov2") algorithm, which can result in a trained algorithm (function 129). Server 108 can subsequently use the trained algorithm to detect and identify vehicle parts on incoming captured images (e.g., captured image 122 of vehicle 120, as received from computing device 104 and as taken by user 102 using computing device 104).

Figure 2:
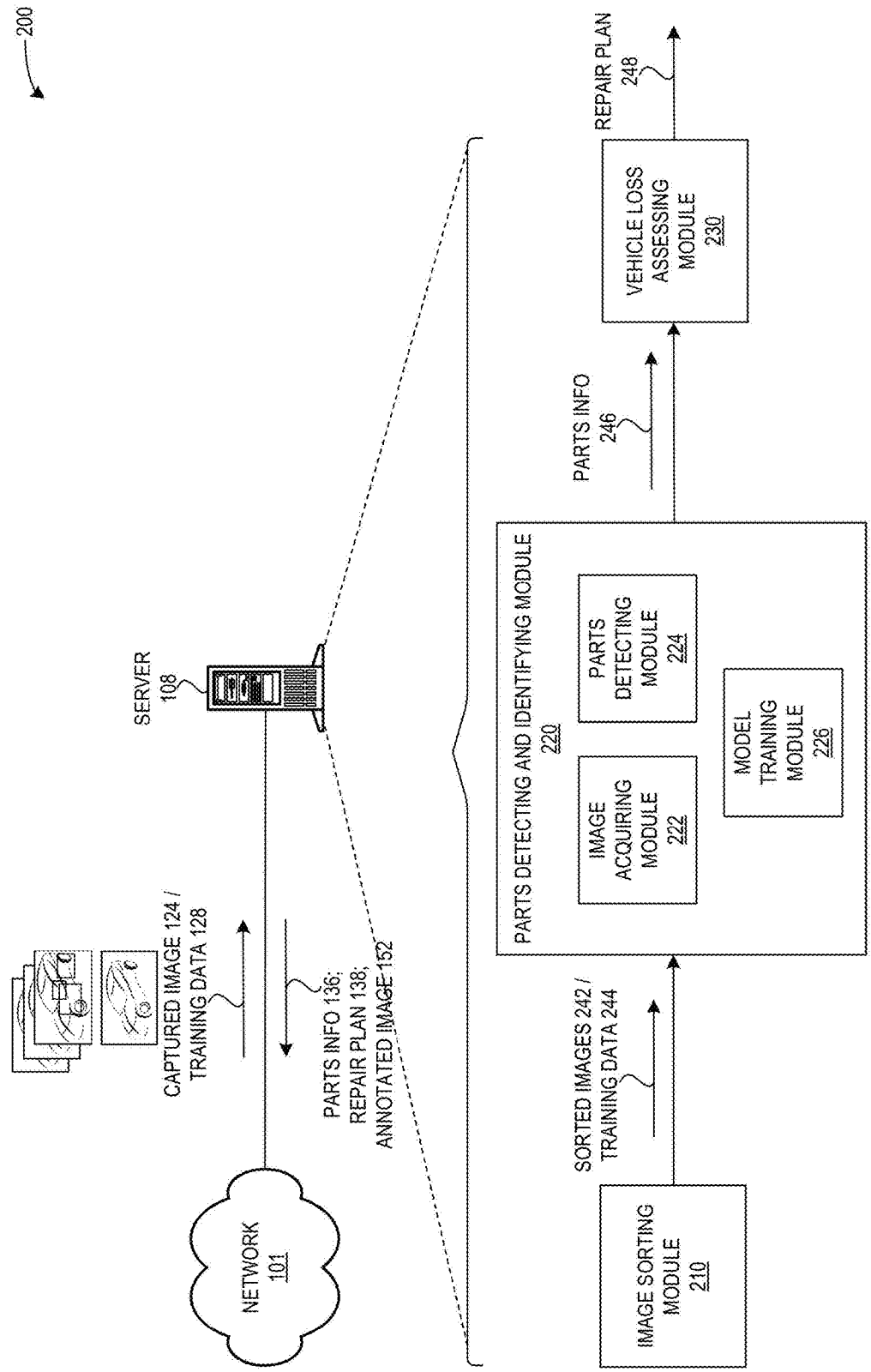
FIG. 2 illustrates an exemplary environment for facilitating detection and identification of vehicle parts, in accordance with an embodiment of the present application.

FIG. 2 illustrates an exemplary environment 200 for facilitating detection and identification of vehicle parts, in accordance with an embodiment of the present application. In environment 200, server 108 can receive captured image 124 and training data 128, and can perform the functions described above in environment 100. Server 108 can include: an image sorting module 210; a parts detecting and identifying module 220; and a vehicle loss assessing module 230. Upon receiving a plurality of captured images which have not yet been sorted ("unsorted images"), image sorting module 210 can sort the unsorted images by removing images which are irrelevant or abnormal to obtain a set of captured sorted images 242 which include captured image 124. An irrelevant image can include an image which does not show any vehicle parts that can be identified, or which depicts only or mostly a background associated with the vehicle. An abnormal image can include an image which includes multiple vehicles, indistinguishable vehicle parts, blurry portions, or other features which render the image out of the ordinary or not useful.

Image sorting module 210 can send both sorted images 242 and training data 244 (i.e., training data 128) to parts detecting and identifying module 220, which can include the following sub-modules: an image acquiring module 222; a parts detecting module 224; and a model training module 226. Image acquiring module 222 can perform functions similar to function 130 of FIG. 1; parts detecting module 224 can perform functions similar to function 132 of FIG. 1; and model training module 226 can perform functions similar to function 129 of FIG. 1. After sub-modules 222, 224, and 226 of module 220 have performed their functions, module 220 can send parts info 246 to a vehicle loss assessing module 230. Parts info 246 can allow vehicle loss assessing module 230 to display an annotated image indicating a detected area of a vehicle part, the vehicle part, and the corresponding class for the vehicle part. Vehicle loss assessing module 230 can perform functions similar to function 134 of FIG. 1. In addition to generating a report (as in function 134), vehicle loss assessing module can also generate a repair plan 248, and server 108 can subsequently display the generated repair plan 248 on a display screen.

Exemplary Method for Facilitating Detection and Identification of Vehicle Parts

Figure 3:
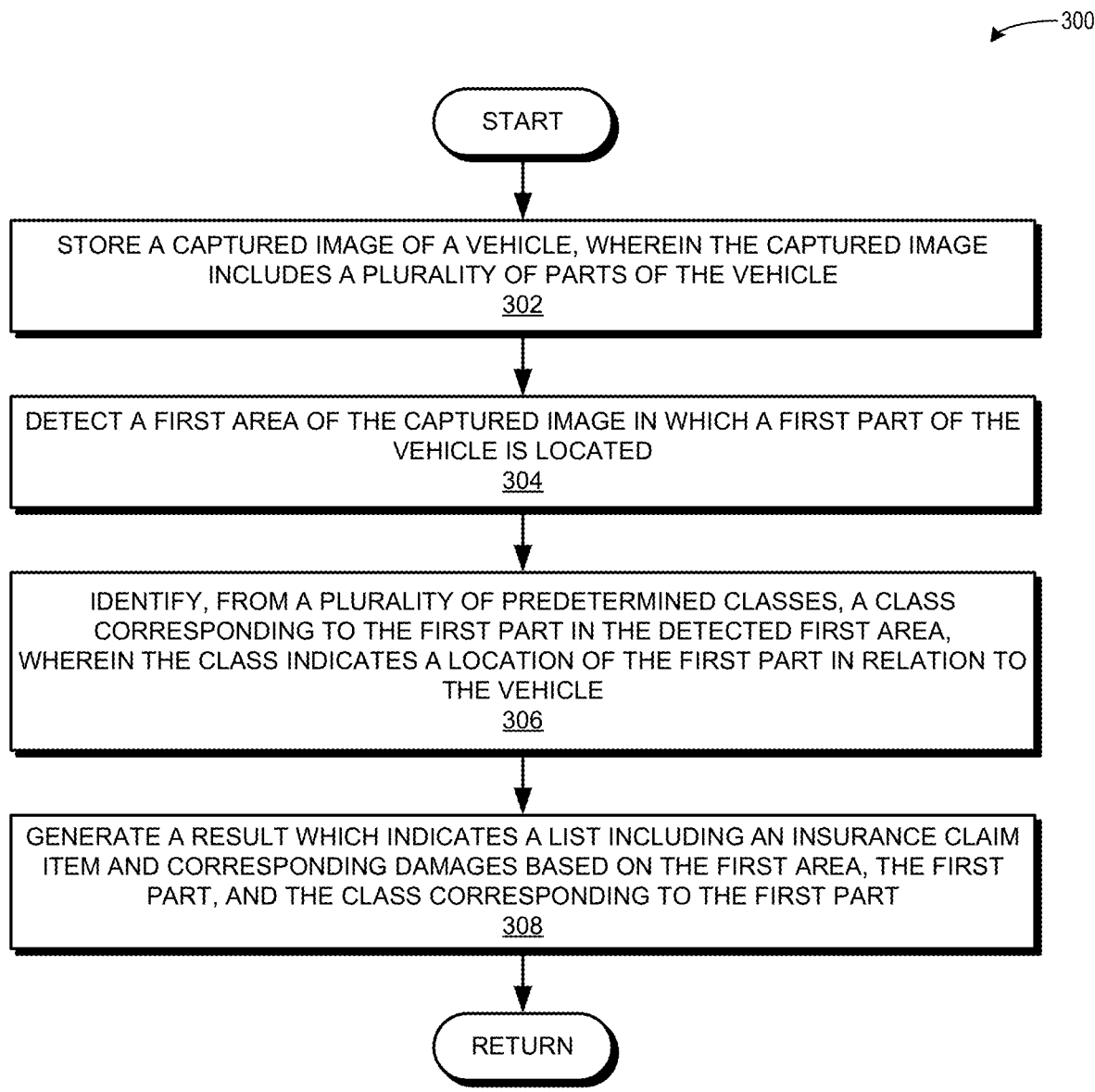
FIG. 3 presents a flowchart illustrating an exemplary method for facilitating detection and identification of vehicle parts, in accordance with an embodiment of the present application.

FIG. 3 presents a flowchart 300 illustrating an exemplary method for facilitating detection and identification of vehicle parts, in accordance with an embodiment of the present application. During operation, the system stores a captured image of a vehicle, wherein the captured image includes a plurality of parts of the vehicle (operation 302). The system detects a first area of the captured image in which a first part of the vehicle is located (operation 304). The system identifies, from a plurality of predetermined classes, a class corresponding to the first part in the detected first area, wherein the class indicates a location of the first part in relation to the vehicle (operation 306). The system generates a result which indicates a list including an insurance claim item and corresponding damages based on the first area, the first part, and the class corresponding to the first part (operation 308). The system can store the generated result, and use the generated result to produce, e.g., reports. In some embodiments, the system can display, on a display screen of a computing device, an annotated image of the captured image, wherein the annotated image indicates the first area, the first part, and the class corresponding to the first part. The system can generate, based on the annotated image, a report which indicates a degree of damage to the first part. Note that the annotated image is not always necessary for generating the result or identifying the corresponding class.

Figure 4A:
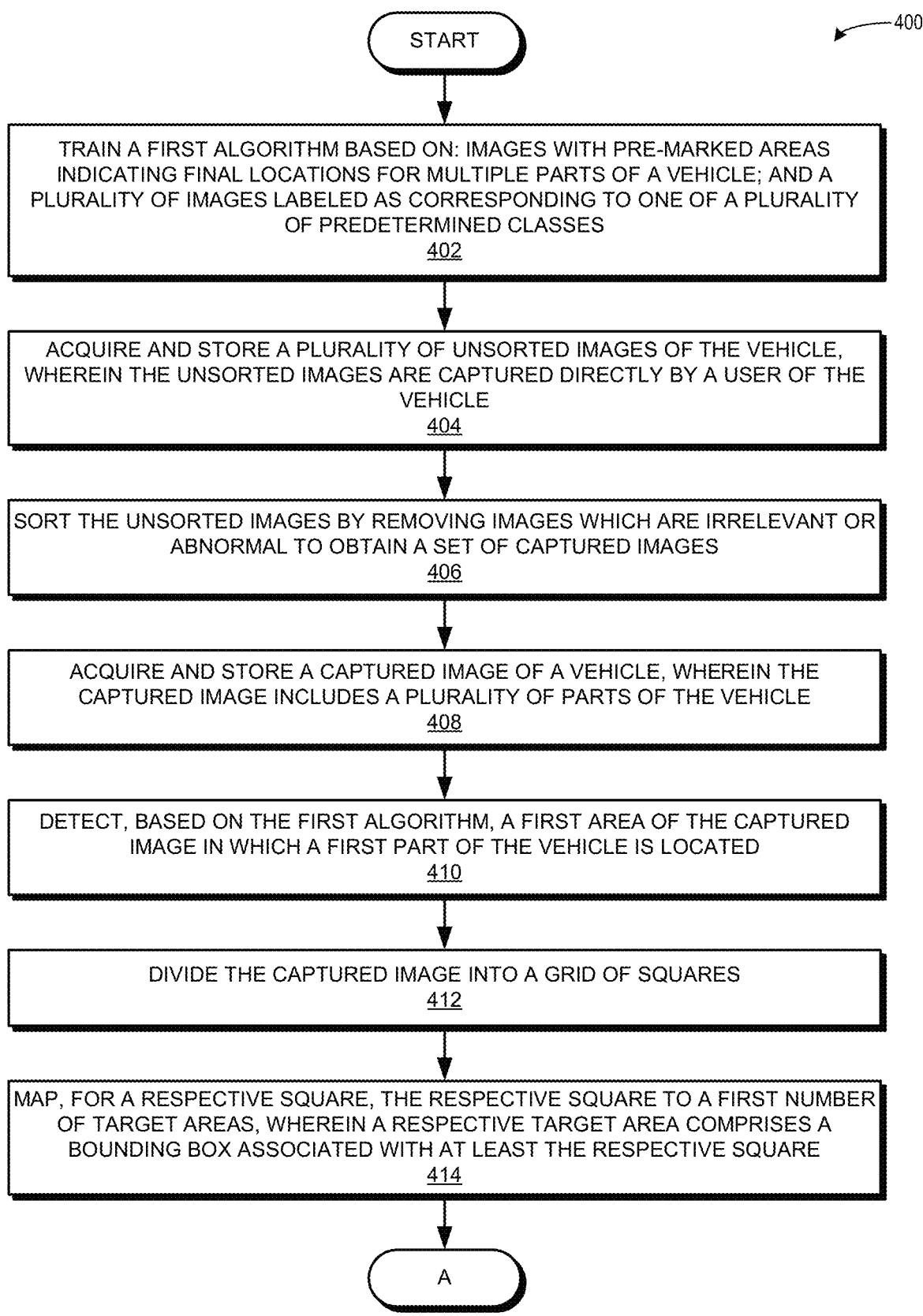
FIG. 4A presents a flowchart illustrating an exemplary method for facilitating detection and identification of vehicle parts, in accordance with an embodiment of the present application.

Exemplary Method for Facilitating Detection and Identification of Vehicle Parts, Including Training a Neural Model FIG. 4A presents a flowchart 400 illustrating an exemplary method for facilitating detection and identification of vehicle parts, in accordance with an embodiment of the present application. During operation, the system trains a first algorithm based on: images with pre-marked areas indicating final locations for multiple parts of the vehicle; and a plurality of sample images of a predetermined class corresponding to a respective part of the vehicle (operation 402). A pre-marked area can include annotations of an area in which a first vehicle part is located, the first vehicle part, and a class corresponding to the first vehicle part.

The system acquires a plurality of unsorted images of the vehicle, wherein the unsorted images are captured directly by a user of the vehicle (operation 404). The system sorts the unsorted images by removing images which are irrelevant or abnormal to obtain a set of captured images which include the captured image (operation 406). The system acquires and stores a captured image of a vehicle, wherein the captured image includes a plurality of parts of the vehicle (operation 408).

The system detects, based on the first algorithm, a first area of the captured image in which a first part of the vehicle is located (operation 410). The system divides the captured images into a grid of squares (operation 412). The system maps, for a respective square, the respective square to a first number of target areas, wherein a respective target area comprises a bounding box associated with at least the respective square (operation 414). The operation continues at Label A of FIG. 4B.

Figure 4B:
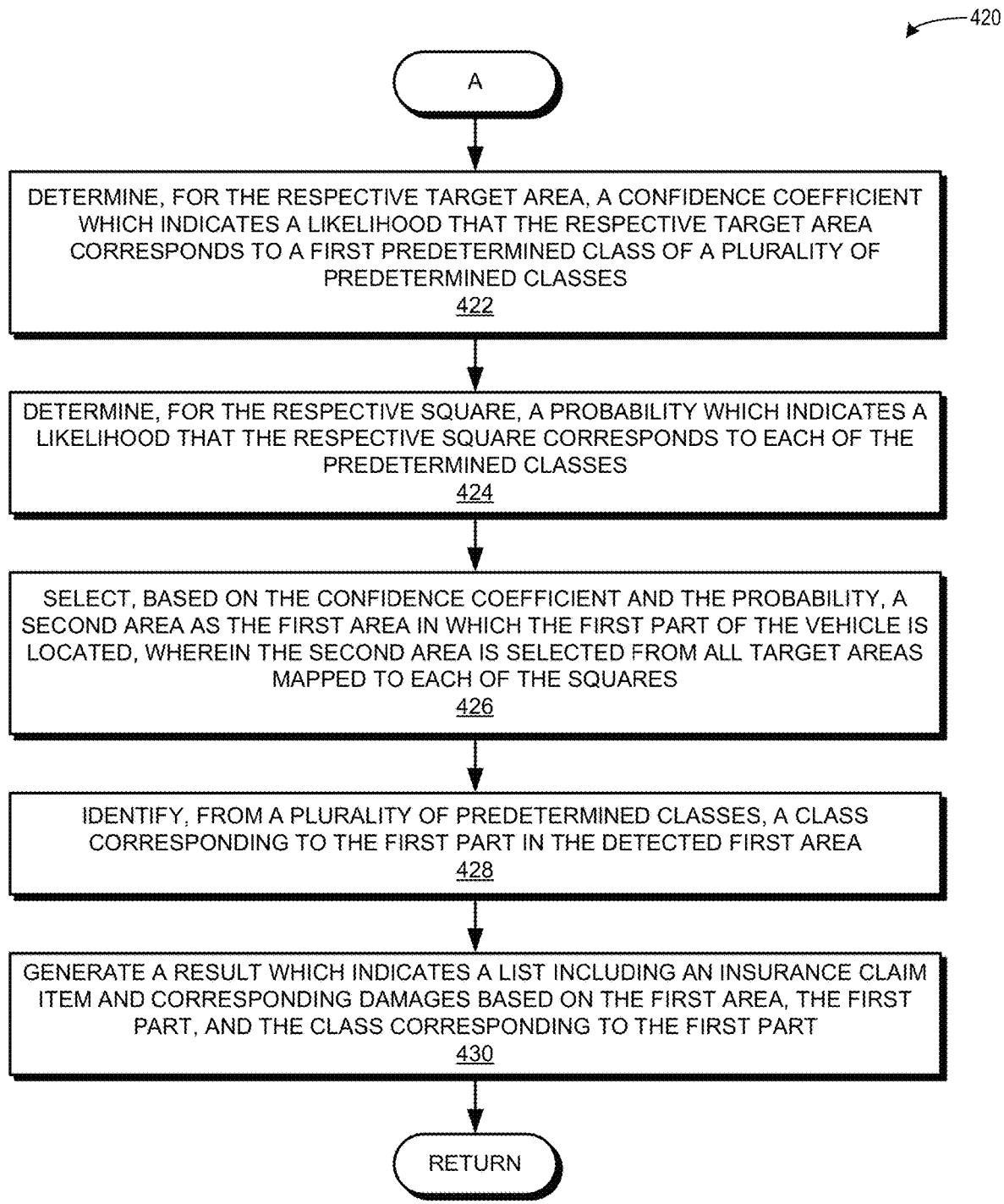
FIG. 4B presents a flowchart illustrating an exemplary method for facilitating detection and identification of vehicle parts, in accordance with an embodiment of the present application.

FIG. 4B presents a flowchart 420 illustrating an exemplary method for facilitating detection and identification of vehicle parts, in accordance with an embodiment of the present application. The system determines, for the respective target area, a confidence coefficient which indicates a likelihood that the respective target area corresponds to a first predetermined class (operation 422). The system determines, for the respective square, a probability which indicates a likelihood that the respective square corresponds to each of the predetermined classes (operation 424). The system selects, based on the confidence coefficient and the probability, a second area as the first area in which the first part of the vehicle is located, wherein the second area is selected from all target areas mapped to each of the squares (operation 426).

The system identifies, from a plurality of predetermined classes, a class corresponding to the first part in the detected first area (operation 428). The class indicates a location of the first part in relation to the vehicle. The system generates a result which indicates a list including an insurance claim item and corresponding damages based on the first area, the first part, and the class corresponding to the first part (operation 430). In some embodiments, the system can display, on a display screen of a computing device, an annotated image of the captured image, wherein the annotated image indicates the first area, the first part, and the class corresponding to the first part. The system can generate, based on the annotated image, a report which indicates a degree of damage to the first part. As described above, the annotated image is not always necessary for generating the result or identifying the corresponding class.

Figure 5A:
FIG. 5A illustrates an exemplary annotated image of a captured image, in accordance with an embodiment of the present application.

Exemplary Captured Images with Annotations Indicating Area, Part, and Class of Vehicle Part FIG. 5A illustrates an exemplary annotated image 500 of a captured image, in accordance with an embodiment of the present application. Annotated image 500 can include, for a plurality of vehicle parts: a first area of the captured image in which a first part of the vehicle is located; the first vehicle part; and a class corresponding to the first vehicle part. In annotated image 500, the system has detected and identified the following vehicle parts: a front engine hood; a right front wheel fender; a right front wheel; a front bumper; a right headlight; a lower grille; a middle grille; a vehicle logo; and a front license plate.

In annotated image 500, for the vehicle part which is the right front wheel, the system can display the following annotations: a detected area 504 in which the right front wheel is located; a part 506 which is the vehicle part which is detected and identified; and a class (indicating location) 502 for the right front wheel. Class 502 is "Right front wheel," and indicates the location of the wheel in relation to the vehicle (i.e., "right" and "front"). Furthermore, in annotated image 500, for the vehicle part which is the front license plate, the system can display the following annotations: a detected area 514 in which the front license plate is located; a part 516 which is the vehicle part which is detected and identified; and a class (indicating location) 512 for the front license plate. Class 512 is "Front license plate," and indicates the location of the license plate in relation to the vehicle (i.e., "front").

Figure 5B:
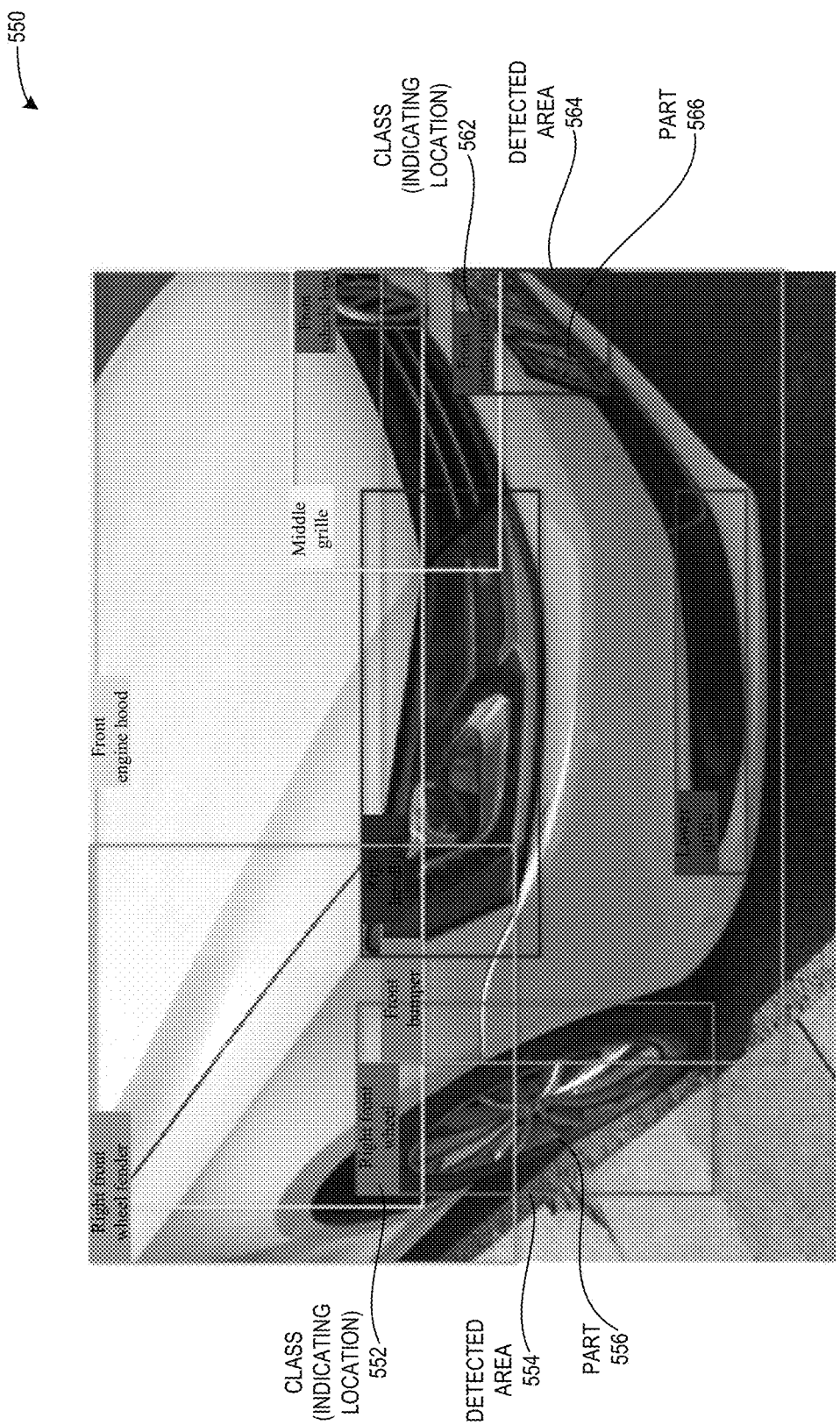
FIG. 5B illustrates an exemplary annotated image of a captured image, in accordance with an embodiment of the present application.

FIG. 5B illustrates an exemplary annotated image 550 of a captured image, in accordance with an embodiment of the present application. In annotated image 550, similar to annotated image 500, the system has detected and identified the following vehicle parts: a front engine hood; a right front wheel fender; a right front wheel; a front bumper; a right headlight; a lower grille; a middle grille; a vehicle logo; and a front license plate.

In annotated image 550, for the vehicle part which is the right front wheel, the system can display the following annotations: a detected area 554 in which the right front wheel is located; a part 556 which is the vehicle part which is detected and identified; and a class (indicating location) 552 for the right front wheel. Class 552 is "Right front wheel," and indicates the location of the wheel in relation to the vehicle (i.e., "right" and "front"). Furthermore, in annotated image 550, for the vehicle part which is the front license plate, the system can display the following annotations: a detected area 564 in which the front license plate is located; a part 566 which is the vehicle part which is detected and identified; and a class (indicating location) 562 for the front license plate. Class 562 is "Front license plate," and indicates the location of the license plate in relation to the vehicle (i.e., "front").

Each vehicle part identified in annotated images 500 and 550 can be generally referred to as a part (e.g., a wheel, a headlight, a bumper, a grille, a fender, a license plate, etc.), and can correspond to a specific class which indicates the location of the part in relation to the vehicle (e.g., right front wheel, right headlight, front bumper, middle grille, right front wheel fender, and front license plate, etc.). Annotated images 500 and 550 can therefore include: a detected area indicated by a bounding box, where the detected area includes a specific vehicle part; the specific vehicle part itself; and the class corresponding to the specific vehicle part, where the class indicates the location of the specific vehicle part in relation to the vehicle.

While the "frames" of the bounding boxes indicating each detected area in FIGS. 5A and 5B are depicted by rectangular shapes, the detected area may also be represented by other shapes/areas, including but not limited to a square, a circle, a parallelogram, a rhomboid, a diamond, and any closed shape whose line segments and/or curves are connected or meet.

Exemplary Computer System and Apparatus

Figure 6:
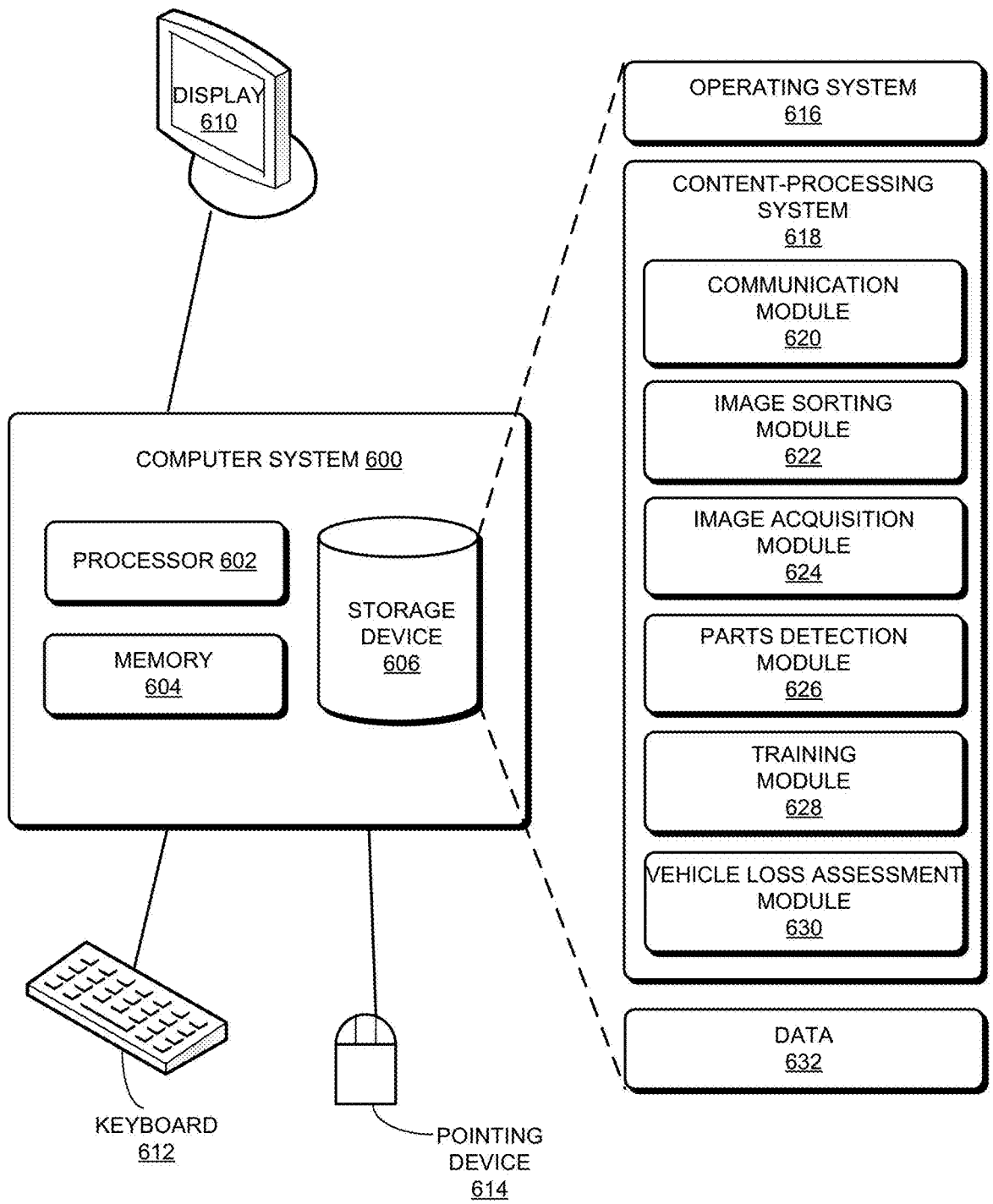
FIG. 6 illustrates an exemplary computer system for facilitating detection and identification of vehicle parts, in accordance with an embodiment of the present application.

FIG. 6 illustrates an exemplary computer system 600 for facilitating detection and identification of vehicle parts, in accordance with an embodiment of the present application. Computer system 600 includes a processor 602, a volatile memory 604, and a storage device 606. Volatile memory 606 can include, e.g., random access memory (RAM), that serves as a managed memory, and can be used to store one or more memory pools. Storage device 608 can include persistent storage. Furthermore, computer system 600 can be coupled to a display device 610, a keyboard 612, and a pointing device 614. Storage device 606 can store an operating system 616, a content-processing system 618, and data 632.

Content-processing system 618 can include instructions, which when executed by computer system 600, can cause computer system 600 to perform methods and/or processes described in this disclosure. Specifically, content-processing system 618 can include instructions for receiving and transmitting data packets, including: data to be processed, annotated, classified, and stored; an image; a class; and a report (communication module 620).

Content-processing system 618 can further include instructions for storing a captured image of a vehicle, wherein the captured image includes a plurality of parts of the vehicle (image acquisition module 624). Content-processing system 618 can include instructions for detecting a first area of the captured image in which a first part of the vehicle is located (parts detection module 626). Content-processing system 618 can include instructions for identifying, from a plurality of predetermined classes, a class corresponding to the first part in the detected first area, wherein the class indicates a location of the first part in relation to the vehicle (parts detection module 626). Content-processing system 618 can also include instructions for generating a result which indicates a list including an insurance claim item and corresponding damages based on the first area, the first part, and the class corresponding to the first part (vehicle loss assessment module 630). Content-processing system 618 can also include instructions for displaying, on a display screen of a computing device, an annotated image of the captured image, wherein the annotated image indicates the first area, the first part, and the class corresponding to the first part (via, e.g., an image display module, not shown). Content-processing system 618 can include instructions for generating, based on the annotated image, a report which indicates a degree of damage to the first part (vehicle loss assessment module 630).

Content-processing system 618 can additionally include instructions for acquiring a plurality of unsorted images of the vehicle, wherein the unsorted images are captured directly by a user of the vehicle (image acquisition module 624). Content-processing system 618 can include instructions for sorting the unsorted images by removing images which are irrelevant or abnormal to obtain a set of captured images which include the captured image (image sorting module 622).

Content-processing system 618 can also include instructions for training the first algorithm based on: images with pre-marked areas indicating final locations for multiple parts of the vehicle; and a plurality of sample images of a predetermined class corresponding to a respective part of the vehicle (training module 628).

Data 632 can include any data that is required as input or generated as output by the methods and/or processes described in this disclosure. Specifically, data 632 can store at least: data; an image; a captured image; an image of a part or parts of a vehicle; a predetermined class or classes; a location of a part of a vehicle in relation to a vehicle; an annotated image; a report; a degree of damage to a part; a grid of squares; a target area; a bounding box associated with at least one square; a confidence coefficient; a likelihood that a target area corresponds to a class; a probability; a likelihood that a square corresponds to each of a set of predetermined classes; a first area of an image; a second area of an image; a first number; a second number; a positive integer; unsorted images; irrelevant images; abnormal images; a first algorithm; a trained first algorithm; the yolov2 algorithm; images with pre-marked areas indicating final locations for parts of a vehicle; sample images of a predetermined class corresponding to a respective part of a vehicle; and a model based on a neural network.

Figure 7:
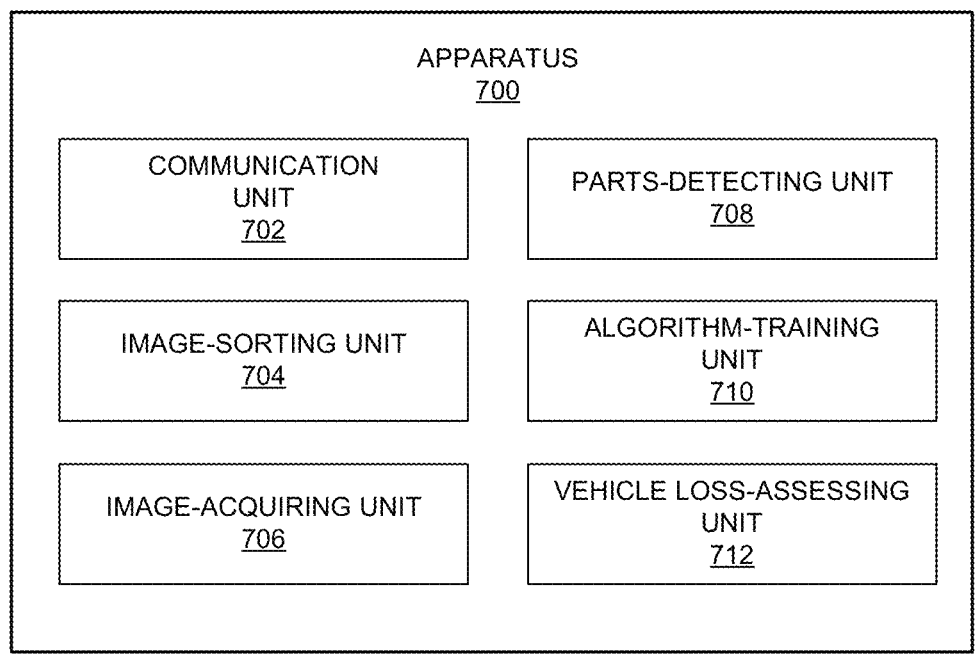
FIG. 7 illustrates an exemplary apparatus for facilitating detection and identification of vehicle parts, in accordance with an embodiment of the present application.

FIG. 7 illustrates an exemplary apparatus 700 for facilitating detection and identification of vehicle parts, in accordance with an embodiment of the present application. Apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device(s) which is/are capable of communicating with other computer systems and/or devices. Specifically, apparatus 700 can comprise units 702-712, which perform functions or operations similar to modules 620-630 of FIG. 6, including: a communication unit 702; an image-sorting unit 704; an image-acquiring unit 706; a parts-detecting unit 708; an algorithm-training unit 710; and a vehicle loss-assessing unit 712.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating detection and identification of vehicle parts, the method comprising:
    storing a captured image of a vehicle, wherein the captured image includes a plurality of parts of the vehicle;
    training a first algorithm based on at least images with pre-marked areas indicating final locations for multiple parts of the vehicle;
    detecting, based on the trained first algorithm, a first area of the captured image in which a first part of the vehicle is located;
    identifying, from a plurality of predetermined classes, a class corresponding to the first part in the detected first area, wherein the class indicates a location of the first part in relation to the vehicle; and
    generating a result which indicates a list including an insurance claim item and corresponding damages based on the first area, the first part, and the class corresponding to the first part.

2. The method of claim 1, wherein detecting the first area comprises:
    dividing the captured image into a grid of squares;
    mapping, for a respective square, the respective square to a first number of target areas, wherein a respective target area comprises a bounding box associated with at least the respective square;
    determining, for the respective target area, a confidence coefficient which indicates a likelihood that the respective target area corresponds to a first predetermined class;
    determining, for the respective square, a probability which indicates a likelihood that the respective square corresponds to each of the predetermined classes; and
    selecting, based on the confidence coefficient and the probability, a second area as the first area in which the first part of the vehicle is located, wherein the second area is selected from all target areas mapped to each of the squares.

3. The method of claim 2, wherein a second number of squares of the grid in a horizontal direction are the same as a second number of squares of the grid in a vertical direction, and wherein the first number and the second number are positive integers.

4. The method of claim 1, wherein prior to storing the captured image of the vehicle, the method further comprises:
    acquiring a plurality of unsorted images of the vehicle, wherein the unsorted images are captured directly by a user of the vehicle; and
    sorting the unsorted images by removing images which are irrelevant or abnormal to obtain a set of captured images which include the captured image.

5. The method of claim 1,
    wherein training the first algorithm is further based on:
        a plurality of sample images of a predetermined class corresponding to a respective part of the vehicle.

6. The method of claim 1, wherein the first algorithm is a You Only Look Once v2 (yolov2) algorithm, and wherein the first algorithm further comprises a model based on a neural network.

7. The method of claim 1, wherein a class includes one or more of:
    a left front door;
    a right front door;
    a left rear door;
    a right rear door;
    a front bumper;
    a rear bumper;
    a left front wheel fender;
    a right front wheel fender;
    a left rear wheel fender;
    a right rear wheel fender;
    a left front tire;
    a right front tire;
    a left rear tire;
    a right rear tire;
    a lower grille;
    a middle grille;
    a left headlight;
    a right headlight;
    a left brake light;
    a right brake light;
    a left front emergency light;
    a right front emergency light;
    a left rear emergency light;
    a right rear emergency light;
    a number plate;
    a front engine hood; and
    a trunk.

8. A computer system for facilitating detection and identification of vehicle parts, the system comprising:
    a processor; and
    a memory coupled to the processor and storing instructions, which when executed by the processor cause the processor to perform a method, wherein the computer system is a storage device, the method comprising:
        storing a captured image of a vehicle, wherein the captured image includes a plurality of parts of the vehicle;
        training a first algorithm based on at least images with pre-marked areas indicating final locations for multiple parts of the vehicle;
        detecting, based on the trained first algorithm, a first area of the captured image in which a first part of the vehicle is located;
        identifying, from a plurality of predetermined classes, a class corresponding to the first part in the detected first area, wherein the class indicates a location of the first part in relation to the vehicle; and
        generating a result which indicates a list including an insurance claim item and corresponding damages based on the first area, the first part, and the class corresponding to the first part.

9. The computer system of claim 8, wherein detecting the first area comprises:
    dividing the captured image into a grid of squares;

mapping, for a respective square, the respective square to a first number of target areas, wherein a respective target area comprises a bounding box associated with at least the respective square;
determining, for the respective target area, a confidence coefficient which indicates a likelihood that the respective target area corresponds to a first predetermined class;
determining, for the respective square, a probability which indicates a likelihood that the respective square corresponds to each of the predetermined classes; and
selecting, based on the confidence coefficient and the probability, a second area as the first area in which the first part of the vehicle is located, wherein the second area is selected from all target areas mapped to each of the squares.

10. The computer system of claim 9, wherein a second number of squares of the grid in a horizontal direction are the same as a second number of squares of the grid in a vertical direction, and wherein the first number and the second number are positive integers.

11. The computer system of claim 8, wherein prior to storing the captured image of the vehicle, the method further comprises:
acquiring a plurality of unsorted images of the vehicle, wherein the unsorted images are captured directly by a user of the vehicle; and
sorting the unsorted images by removing images which are irrelevant or abnormal to obtain a set of captured images which include the captured image.

12. The computer system of claim 8,
wherein training the first algorithm is further based on:
a plurality of sample images of a predetermined class corresponding to a respective part of the vehicle.

13. The computer system of claim 8, wherein the first algorithm is a You Only Look Once v2 (yolov2) algorithm, and wherein the first algorithm further comprises a model based on a neural network.

14. The computer system of claim 8, wherein a class includes one or more of:
a left front door;
a right front door;
a left rear door;
a right rear door;
a front bumper;
a rear bumper;
a left front wheel fender;
a right front wheel fender;
a left rear wheel fender;
a right rear wheel fender;
a left front tire;
a right front tire;
a left rear tire;
a right rear tire;
a lower grille;
a middle grille;
a left headlight;
a right headlight;
a left brake light;
a right brake light;
a left front emergency light;
a right front emergency light;
a left rear emergency light;
a right rear emergency light;
a number plate;
a front engine hood; and
a trunk.

15. A non-transitory computer-readable storage medium storing instructions that when executed by a computer cause the computer to perform a method for facilitating detection and identification of vehicle parts, the method comprising:
storing a captured image of a vehicle, wherein the captured image includes a plurality of parts of the vehicle;
training a first algorithm based on at least images with pre-marked areas indicating final locations for multiple parts of the vehicle;
detecting, based on the trained first algorithm, a first area of the captured image in which a first part of the vehicle is located;
identifying, from a plurality of predetermined classes, a class corresponding to the first part in the detected first area, wherein the class indicates a location of the first part in relation to the vehicle; and
generating a result which indicates a list including an insurance claim item and corresponding damages based on the first area, the first part, and the class corresponding to the first part.

16. The storage medium of claim 15, wherein prior to storing the captured image of the vehicle, the method further comprises:
acquiring a plurality of unsorted images of the vehicle, wherein the unsorted images are captured directly by a user of the vehicle; and
sorting the unsorted images by removing images which are irrelevant or abnormal to obtain a set of captured images which include the captured image.

17. The storage medium of claim 15,
wherein training the first algorithm is further based on:
a plurality of sample images of a predetermined class corresponding to a respective part of the vehicle.

18. The storage medium of claim 15, wherein a class includes one or more of:
a left front door;
a right front door;
a left rear door;
a right rear door;
a front bumper;
a rear bumper;
a left front wheel fender;
a right front wheel fender;
a left rear wheel fender;
a right rear wheel fender;
a left front tire;
a right front tire;
a left rear tire;
a right rear tire;
a lower grille;
a middle grille;
a left headlight;
a right headlight;
a left brake light;
a right brake light;
a left front emergency light;
a right front emergency light;
a left rear emergency light;
a right rear emergency light;
a number plate;
a front engine hood; and
a trunk.

19. The storage medium of claim 15, wherein detecting the first area comprises:
dividing the captured image into a grid of squares;
mapping, for a respective square, the respective square to a first number of target areas, wherein a respective target area comprises a bounding box associated with at least the respective square;

determining, for the respective target area, a confidence coefficient which indicates a likelihood that the respective target area corresponds to a first predetermined class;

determining, for the respective square, a probability which indicates a likelihood that the respective square corresponds to each of the predetermined classes; and selecting, based on the confidence coefficient and the probability, a second area as the first area in which the first part of the vehicle is located, wherein the second area is selected from all target areas mapped to each of the squares.

20. The storage medium of claim 19, wherein a second number of squares of the grid in a horizontal direction are the same as a second number of squares of the grid in a vertical direction, and wherein the first number and the second number are positive integers.

* * * * *